United States Patent
Wallis et al.

(10) Patent No.: US 11,281,483 B2
(45) Date of Patent: Mar. 22, 2022

(54) PRESERVING TRANSIENT ADDRESS TRANSLATION INFORMATION ACROSS A FIRMWARE ASSISTED DUMP PROCEDURE

(71) Applicant: International Business Machines Corporation, Armonk, NY (US)

(72) Inventors: Christopher Brian Wallis, Rochester, MN (US); Wade Byron Ouren, Rochester, MN (US); Stuart Zachary Jacobs, Lakeville, MN (US); Troy David Armstrong, Rochester, MN (US); Kenneth Charles Vossen, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 404 days.

(21) Appl. No.: 16/654,294

(22) Filed: Oct. 16, 2019

(65) Prior Publication Data
US 2021/0117215 A1      Apr. 22, 2021

(51) Int. Cl.
*G06F 9/455* (2018.01)
*G06F 11/07* (2006.01)
(Continued)

(52) U.S. Cl.
CPC ...... *G06F 9/45545* (2013.01); *G06F 9/45558* (2013.01); *G06F 11/0778* (2013.01);
(Continued)

(58) Field of Classification Search
CPC ............ G06F 9/45545; G06F 9/45558; G06F 11/0778; G06F 11/1438; G06F 12/1018; G06F 2009/45583
See application file for complete search history.

(56) References Cited

U.S. PATENT DOCUMENTS 7,809,921 B2    10/2010  Davis
8,132,057 B2     3/2012  Jann et al.
(Continued)

OTHER PUBLICATIONS

Zhang et al., "CloudVisor: Retrofitting Protection of Virtual Machines In Multi-Tenant Cloud With Nested Virtualization", SOSP'11 23rd ACM Symposium On, pp. 203-216, Oct. 23-26, 2011.
(Continued)

*Primary Examiner* — Wissam Rashid
(74) *Attorney, Agent, or Firm* — Garg Law Firm, PLLC; Rakesh Garg; Nathan Rau

(57) ABSTRACT

Within a hashed page table maintained by a hypervisor, a special host real address configured to access a hardware device using access data intended to be invalidated is identified as part of a firmware assisted dump process for a virtual machine executing on the hypervisor. The special host real address is translated to a corresponding special guest real address. Within the hashed page table, the special host real address is replaced with the corresponding special guest real address, and the corresponding special guest real address is marked as invalid and requiring special handling. Subsequent to the replacing, the special host real address is invalidated. The special guest real address and translated address information are provided to the virtual machine subsequent to the invalidating, the translated address information comprising a set of host real addresses translated to corresponding guest real addresses.

20 Claims, 6 Drawing Sheets

(51) Int. Cl.
*G06F 11/14* (2006.01)
*G06F 12/1018* (2016.01)

(52) U.S. Cl.
CPC ...... *G06F 11/1438* (2013.01); *G06F 12/1018* (2013.01); *G06F 2009/45583* (2013.01)

(56) References Cited

U.S. PATENT DOCUMENTS

| | | |
|---|---|---|
| 8,370,587 B2 | 2/2013 | Miyamoto |
| 9,740,629 B2 | 8/2017 | Blaner et al. |
| 10,248,573 B2 | 4/2019 | Bradbury et al. |
| 10,282,305 B2 | 5/2019 | Borntraeger et al. |
| 2016/0246732 A1 | 8/2016 | Shanbhogue et al. |
| 2018/0136867 A1 | 5/2018 | Tsirkin |
| 2019/0042467 A1 | 2/2019 | Sahita et al. |
| 2019/0163643 A1 | 5/2019 | Yang |
| 2019/0171577 A1 | 6/2019 | Arcangeli et al. |
| 2019/0205149 A1 | 7/2019 | Zhang et al. |

OTHER PUBLICATIONS

Ahn et al., "Revisting Hardware-Assisted Page Walks For Virtualized Systems", ISCA IEEE 39th Annual International Symposium On, pp. 476-487, Jun. 9-13, 2012.

Singh, "Taking It To The Nest Level—Nested KVM on The POWER9 Processor", IBM Australia, pp. 1-139, Nov. 15, 2018.

Han et al., "Myth And Truth About Hypervisor-Based Kernel Protector: The Reason Why You Need Shadow-Box", Back Hat Asia 2017, pp. 1-13, Mar. 30-31, 2017.

PRESERVING TRANSIENT ADDRESS TRANSLATION INFORMATION ACROSS A FIRMWARE ASSISTED DUMP PROCEDURE

TECHNICAL FIELD

The present invention relates generally to a method, system, and computer program product for additional hypervisor functionality. More particularly, the present invention relates to a method, system, and computer program product for preserving transient address translation information across a firmware assisted dump procedure.

BACKGROUND

A hypervisor is software or firmware that creates and runs virtual machines (VMs). A computer on which a hypervisor runs one or more virtual machines is called a host, and each virtual machine is also called a guest. A hypervisor acts as an abstraction layer, presenting one or more guest operating systems executing on a VM with a virtualized view of the actual host hardware.

Each guest operating system (OS) supports one or more applications executing in the VM, and insulates the executing applications from each other by providing each with a virtual address space. When an application needs to access a memory location, the application does so using a guest virtual memory address. The guest OS translates the guest virtual memory address into a corresponding guest real address, referencing a location in guest physical memory. However, because a hypervisor abstracts guest physical memory, the hypervisor translates a guest real address into a corresponding host real address, ultimately referencing a location in host physical memory. A hypervisor manages translations of guest virtual addresses to host real addresses using translation information stored in a hashed page table.

A memory mapped addressing scheme is also used to access device other than memory. In a memory mapped addressing scheme, locations, such as registers and memory, within a device are mapped to memory locations within a host's physical address space. A guest reads data from the device by reading a special memory address within a bank of addresses assigned to the hardware. A guest writes data to the hardware by writing a special memory address within a bank of addresses assigned to the device. As well, in some memory mapped devices reading or writing a specific location triggers an operation of the device. For example, writing a specific storage location might trigger the device to start an operation, or reading a specific storage location might trigger the device to report status of an operation. To accommodate hardware that is accessed using a memory mapped addressing scheme, a hypervisor maintains a set of special host real addresses within the hashed page table. To translate between a guest real address and a special host real address, a hypervisor manages a translation table, separate from the hashed page table used to translate guest virtual addresses to host real addresses.

A firmware assisted dump is a procedure that executes in a hypervisor after a guest OS crashes. A firmware assisted dump attempts to collect the state of the guest just before the crash occurred in order to debug the crash. In particular, when a guest crashes, the firmware, or hypervisor, reboots the guest using a special procedure that preserves the guest's memory contents and other necessary debug information, while resetting the remainder of the guest's state to a known configuration. Resetting the remainder of the guest's state clears errors that may have been left by the crash and ensures that the guest will be functional again after the reboot. Once the guest has completed rebooting, the guest is responsible for copying all data relevant to the crash to a reserved location before performing any operations that might override the preserved state from the crash.

To aid in debugging the crash, a guest preserves memory address translation information stored in a hashed page table. Although the hashed page table is owned by the hypervisor, a guest manages the table, requesting table modifications from the hypervisor. During a firmware assisted dump, the guest preserves memory address translation information by requesting the information from the hypervisor. In response, the hypervisor translates host real addresses to guest real addresses and provides the guest real addresses to the guest for preservation. Translating host real addresses to guest real addresses, upon request during the firmware assisted dump, requires that all addresses being translated have a valid address translation, from host real address to guest real address.

SUMMARY

The illustrative embodiments provide a method, system, and computer program product. An embodiment includes a method that identifies, within a hashed page table maintained by a hypervisor, a special host real address, the special host real address configured to access a hardware device using access data intended to be invalidated during an upcoming reset of the hardware device, the identifying occurring as part of a firmware assisted dump process for a virtual machine executing on the hypervisor. An embodiment translates the special host real address to a corresponding special guest real address, the special guest real address comprising an address at which the virtual machine accesses the hardware device. An embodiment replaces, within the hashed page table, the special host real address with the corresponding special guest real address. An embodiment marks, within the hashed page table, the corresponding special guest real address as invalid and requiring special handling. An embodiment causes the invalidating, subsequent to the replacing, of the special host real address. An embodiment provides, to the virtual machine subsequent to the invalidating, the special guest real address and translated address information, the translated address information comprising a set of host real addresses translated to corresponding guest real addresses.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
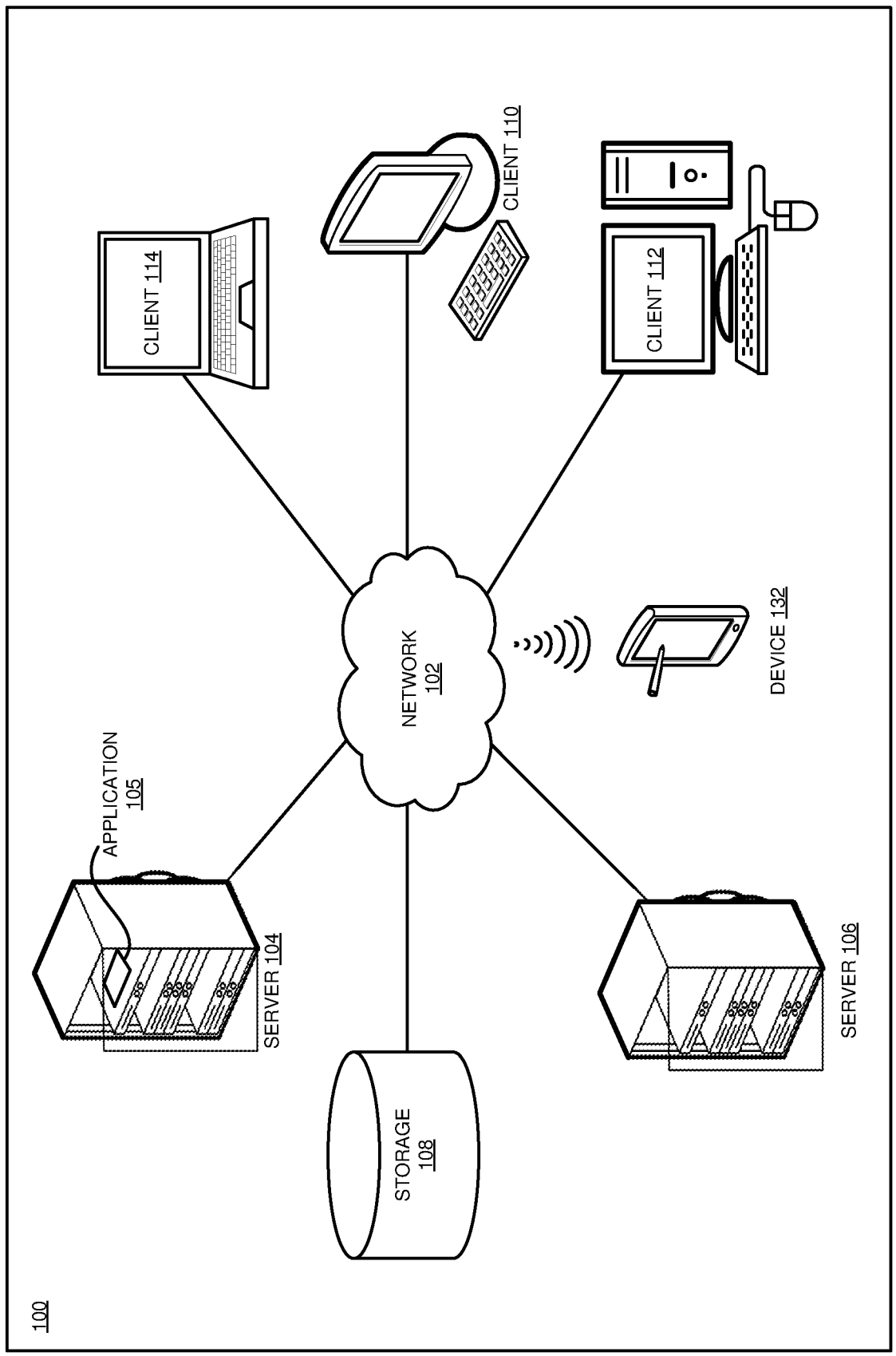
FIG. 1 depicts a block diagram of a network of data processing systems in which illustrative embodiments may be implemented.

The illustrative embodiments recognize that, when a guest crashes and is rebooted, hardware associated with special host real addresses must be reset as well, invalidating the special host real addresses and the hypervisor-owned translation information. As part of the reboot process, the guest establishes new hardware associations if necessary. However, the guest performs the firmware assisted dump process before the new mappings are established. In addition, even if the guest were to perform the firmware assisted dump after the new mappings are established, the new mappings might not be the same as the previous mappings. As a result, when the guest requests address translation information during the firmware assisted dump, the hashed page table contents preserved across the reboot include translations, still marked as valid, to hardware that was in use before the crash but has been reset and may no longer be associated with the guest. Thus, the guest could use those translations to attempt to access resources it is no longer allowed to access.

The illustrative embodiments recognize that one potential solution to this problem is to modify the guest OS to prevent attempting to access resources it is no longer allowed to access, or to otherwise modify the guest's execution of the firmware dump process. However, it is the hypervisor's, not the guest OSs', job to prevent access to disallowed resources. In addition, modifying many different guest OSs to support specific hardware is undesirable and error-prone. Instead, modifying one hypervisor is preferred.

The illustrative embodiments recognize that a potential solution to this problem, within the hypervisor, is to preserve the structures that contain the hypervisor translation information across the guest reboot. However, this requires all components of the hypervisor using the special real addresses to preserve the translation structures and hardware assignments across a reboot. As well, each affected hypervisor component must resolve any errors generated by the crash and reconfigure the affected structures back to a normal state after the guest saves the page table contents. Consequently, this potential solution requires extensive hypervisor changes and is error-prone.

The illustrative embodiments recognize that another potential solution to this problem, within the hypervisor, is to save the special host real address translation information in a separate hypervisor-owned area of memory before allowing the associated hardware to be reset. However, the additional hypervisor memory required to store the additional information must be reserved to ensure availability during the firmware assisted dump, making the memory unavailable for guest or other uses. In addition, because the guest, not the hypervisor, controls the number of translation structures in use at the time of the firmware assisted dump, the hypervisor must reserve memory for the maximum possible number of translation information structures—in effect, doubling the amount of memory required to store translation information. For example, in one implementation if a guest has 32 terabytes assigned to it, the hashed page table is 1/32 of the guest memory size, or one terabyte, and duplicating the table for use in the event of a firmware assisted dump would require another terabyte. As well, the duplicate structures must be maintained for each guest, removing even more hypervisor memory from another use. Consequently, this potential solution requires an inefficient use of hypervisor memory.

Consequently, the illustrative embodiments recognize that what is needed in the art is a method of preserving special address host real translation information across a reset of the underlying hardware without requiring extra memory, special support from guests, or modifying areas of the hypervisor using special host real addresses.

The illustrative embodiments recognize that the presently available tools or solutions do not address these needs or provide adequate solutions for these needs. The illustrative embodiments used to describe the invention generally address and solve the above-described problems and other problems related to preserving transient address translation information across a firmware assisted dump procedure.

An embodiment can be implemented as a software application. The application implementing an embodiment can be configured as a modification of an existing hypervisor or other guest management system, as a separate application that operates in conjunction with an existing hypervisor or other guest management system, a standalone application, or some combination thereof.

Particularly, some illustrative embodiments provide a method for identifying a special host real address as special, translating the special host real address to a corresponding guest real address, and saving the translation before the hardware associated with the special host real address is reset, so that the address is available for provision to a virtual machine upon request later during a firmware assisted dump.

At the start of a firmware assisted dump for a virtual machine executing on a hypervisor, before the hardware associated with any special host real addresses is reset or a host real address requiring special handling across a guest crash and reboot is invalidated, an embodiment identifies one or more special host real addresses within a hypervisor-maintained hashed page table or translation table. In one embodiment, the special host real address is configured to access a hardware device using a memory mapped addressing scheme. In another embodiment, the special host real address requires special handling across a guest crash, reboot, and firmware assisted dump process for another reason.

An embodiment translates the special host real address to a corresponding special guest real address. The special guest real address is an address at which the virtual machine accessed the hardware device before the crash and subsequent reboot.

An embodiment replaces, within the hashed page table, the special host real address with the corresponding special guest real address and marks, within the hashed page table, the corresponding special guest real address as invalid and requiring special handling. Because the entry no longer contains the expected host real address, marking the entry as invalid prevents the guest or hardware from incorrectly using the table entry.

Once all special host real addresses requiring preservation have been identified, translated, replaced, and marked, an embodiment resets any underlying hardware devices, invalidating the special host real address. Then, at a later time in the firmware assisted dump, the guest requests hashed page table data from the hypervisor. An embodiment, implemented in the hypervisor, translates hashed page table entries that were not marked for special handling, and thus still contain host real addresses, to guest real addresses. Entries that were previously marked for special handling and invalidated, and thus contain guest real addresses, do not require translation. Instead, an embodiment marks such entries as valid and clears the special handling indication. An embodiment then provides the updated hashed page table information to the requesting guest. After receiving the updated hashed page table data, the guest uses a presently-available software mechanism to clear the entire hashed page table, also clearing entries marked as containing guest real addresses. Entries marked as containing guest real addresses are only used to support a firmware assisted dump. An embodiment rejects other operations related to entries marked as containing guest real addresses, causing such operations to behave as if such entries are invalid.

The manner of preserving transient address translation information across a firmware assisted dump procedure described herein is unavailable in the presently available methods in the technological field of endeavor pertaining to virtual machine management. A method of an embodiment described herein, when implemented to execute on a device or data processing system, comprises substantial advancement of the functionality of that device or data processing system in identifying a special host real address as special, translating the special host real address to a corresponding guest real address, and saving the translation before the hardware associated with the special host real address is reset, so that the address is available for provision to a virtual machine upon request later during a firmware assisted dump.

The illustrative embodiments are described with respect to certain types of hosts, guests, operating system, hypervisors, virtual machines, firmware assisted dump procedures, real addresses, virtual addresses, address page tables, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
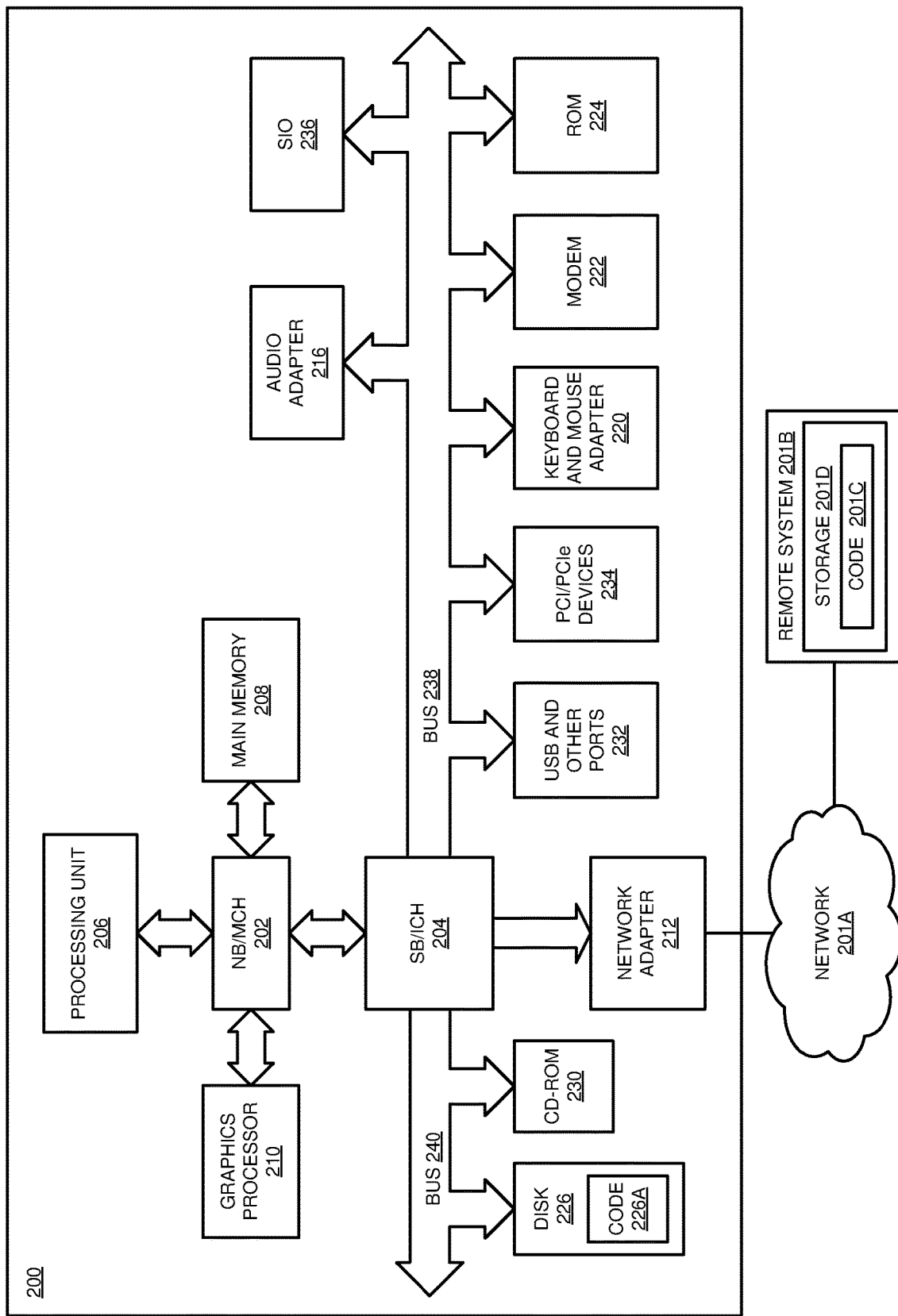
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes as part of a hypervisor, in any of servers 104 and 106, clients 110, 112, and 114, and device 132. Storage unit 108 is an example of a hardware device that is accessible using a memory mapped addressing scheme in a manner described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
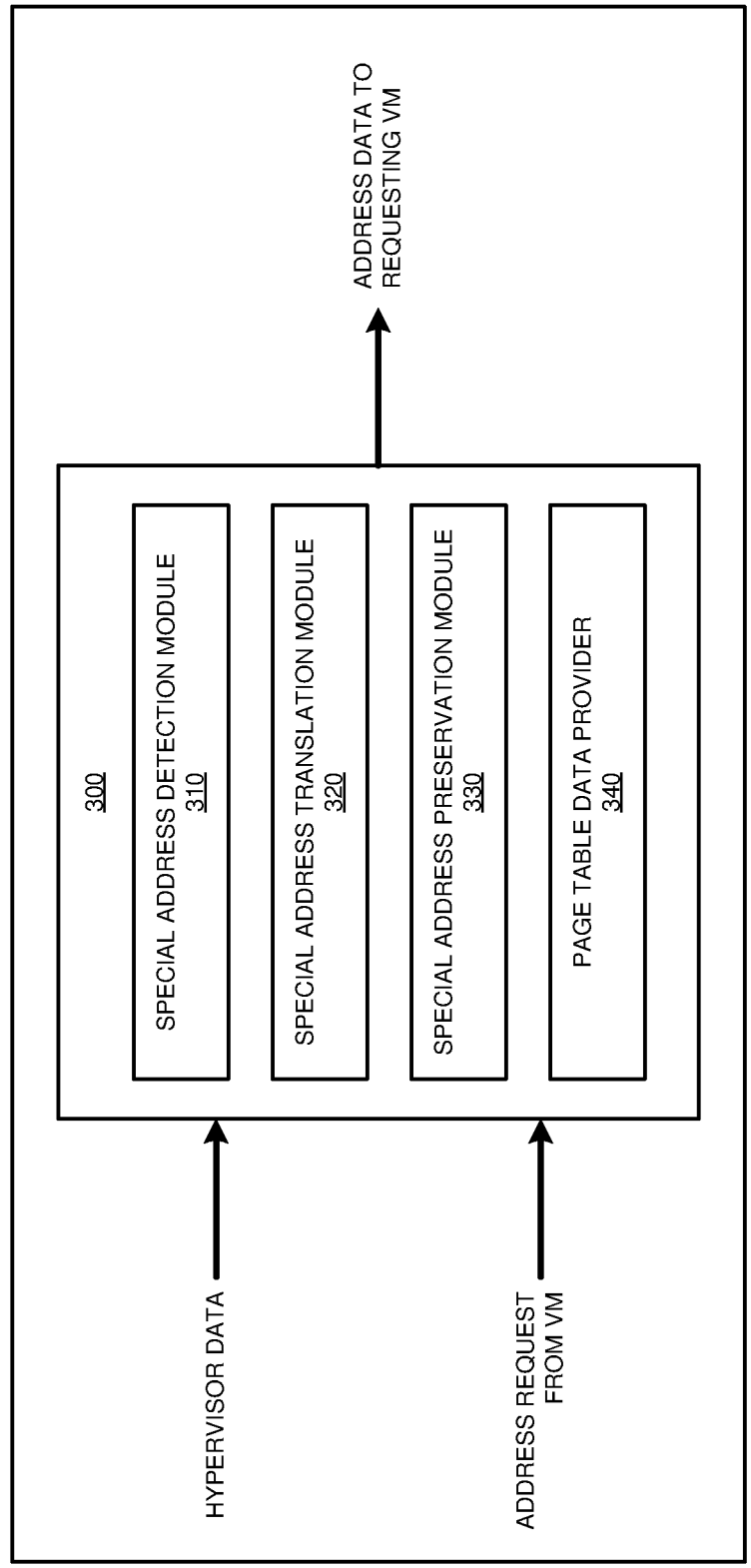
FIG. 3 depicts a block diagram of an example configuration for preserving transient address translation information across a firmware assisted dump procedure in accordance with an illustrative embodiment.

With reference to FIG. 3, this figure depicts a block diagram of an example configuration for preserving transient address translation information across a firmware assisted dump procedure in accordance with an illustrative embodiment. Application 300 is an example of application 105 in FIG. 1 and executes as part of a hypervisor in any of servers 104 and 106, clients 110, 112, and 114, and device 132 in FIG. 1.

At the start of a firmware assisted dump for a virtual machine executing on a hypervisor, before the hardware associated with any special host real addresses is reset or a host real address requiring special handling across a guest crash and reboot is invalidated, special address detection module 310 identifies one or more special host real addresses within a hypervisor-maintained hashed page table or translation table. The special host real address is configured to access a hardware device using a memory mapped addressing scheme.

Special address translation module 320 translates the special host real address to a corresponding special guest real address. The special guest real address is an address at which the virtual machine accessed the hardware device before the crash and subsequent reboot.

Special address preservation module 330 replaces, within the hashed page table, the special host real address with the corresponding special guest real address and marks, within the hashed page table, the corresponding special guest real address as invalid and requiring special handling. Because the entry no longer contains the expected host real address, marking the entry as invalid prevents the guest or hardware from incorrectly using the table entry.

Once all special host real addresses requiring preservation have been identified, translated, replaced, and marked, application 300 resets any underlying hardware devices, invalidating the special host real address. Then, at a later time in the firmware assisted dump, the guest requests hashed page table data from the hypervisor. Page table data provider 340 translates hashed page table entries that were not marked for special handling, and thus still contain host real addresses, to guest real addresses. Entries that were previously marked for special handling and invalidated, and thus contain guest real addresses, do not require translation. Instead, module 340 marks such entries as valid and clears the special handling indication. Module 340 then provides the updated hashed page table information to the requesting guest.

Figure 4:
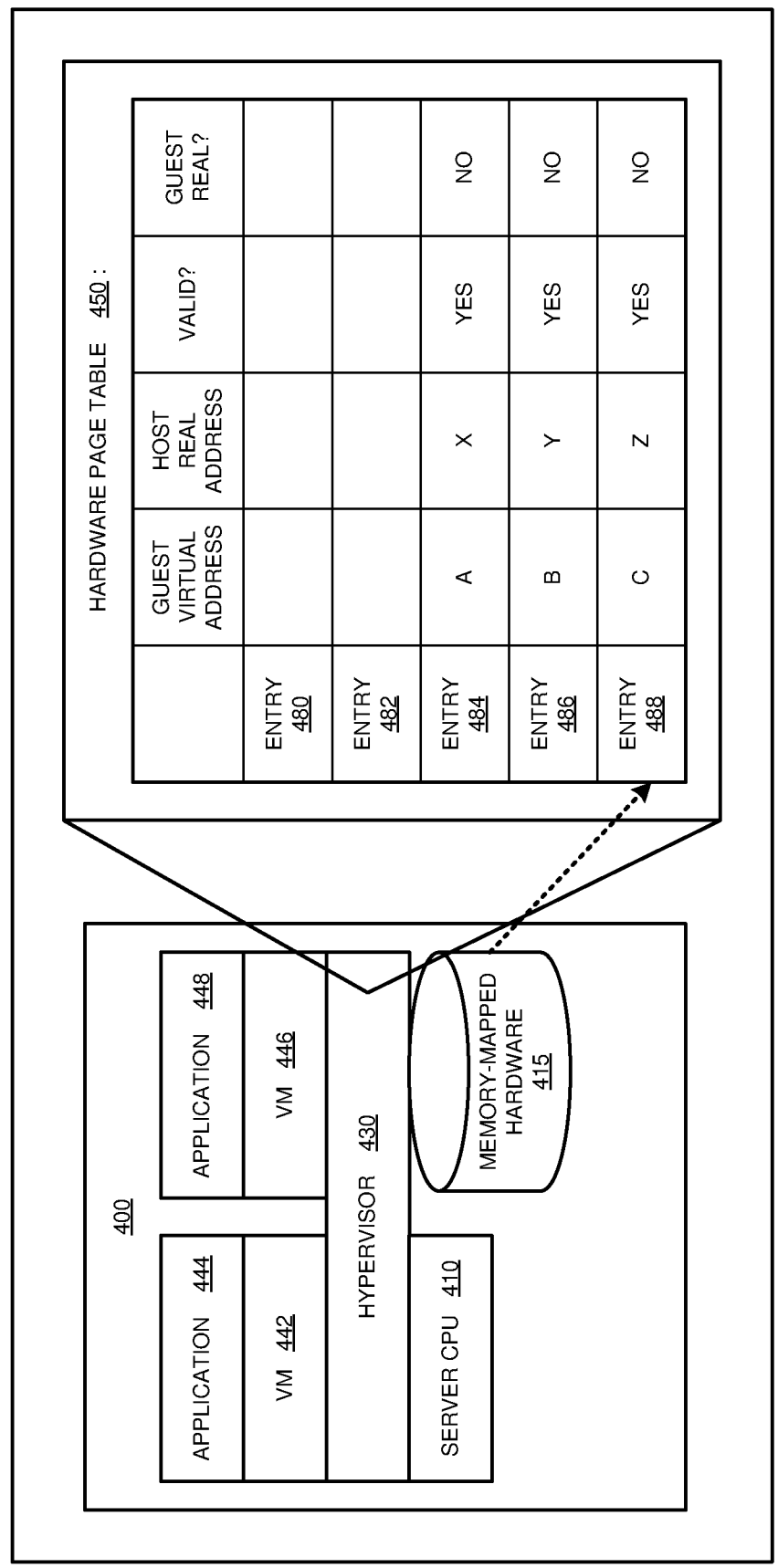
FIG. 4 depicts an example of preserving transient address translation information across a firmware assisted dump procedure in accordance with an illustrative embodiment.

With reference to FIG. 4, this figure depicts an example of preserving transient address translation information across a firmware assisted dump procedure in accordance with an illustrative embodiment. The example can be executed using application in FIG. 3.

In particular, FIG. 4 depicts system 400 at the start of a firmware assisted dump for a virtual machine executing on a hypervisor, before the hardware associated with any special host real addresses is reset or a host real address requiring special handling across a guest crash and reboot is invalidated. In system 400, application 300 executes as part of hypervisor 430, which executes on server central processing unit (CPU) 410. System 400 also includes memory mapped hardware 415, accessed using a memory mapped addressing scheme. Hypervisor 430 hosts VM 442, on which application 444 runs. Hypervisor 430 hosts VM 446, on which application 448 runs.

Within hypervisor 430, application 300 maintains hashed page table 450, including example entries 480, 482, 484, 486, and 488. Each entry includes a guest virtual address, a corresponding host real address, a bit indicating whether or not the entry is valid, and a bit indicating whether or not the entry contains a guest real address instead of a host real address. As depicted, entries 484 and 486 refer to locations within host physical memory. Entry 488 refers to a location within memory mapped hardware 415. Data for entries 480 and 482 is not shown.

Figure 5:
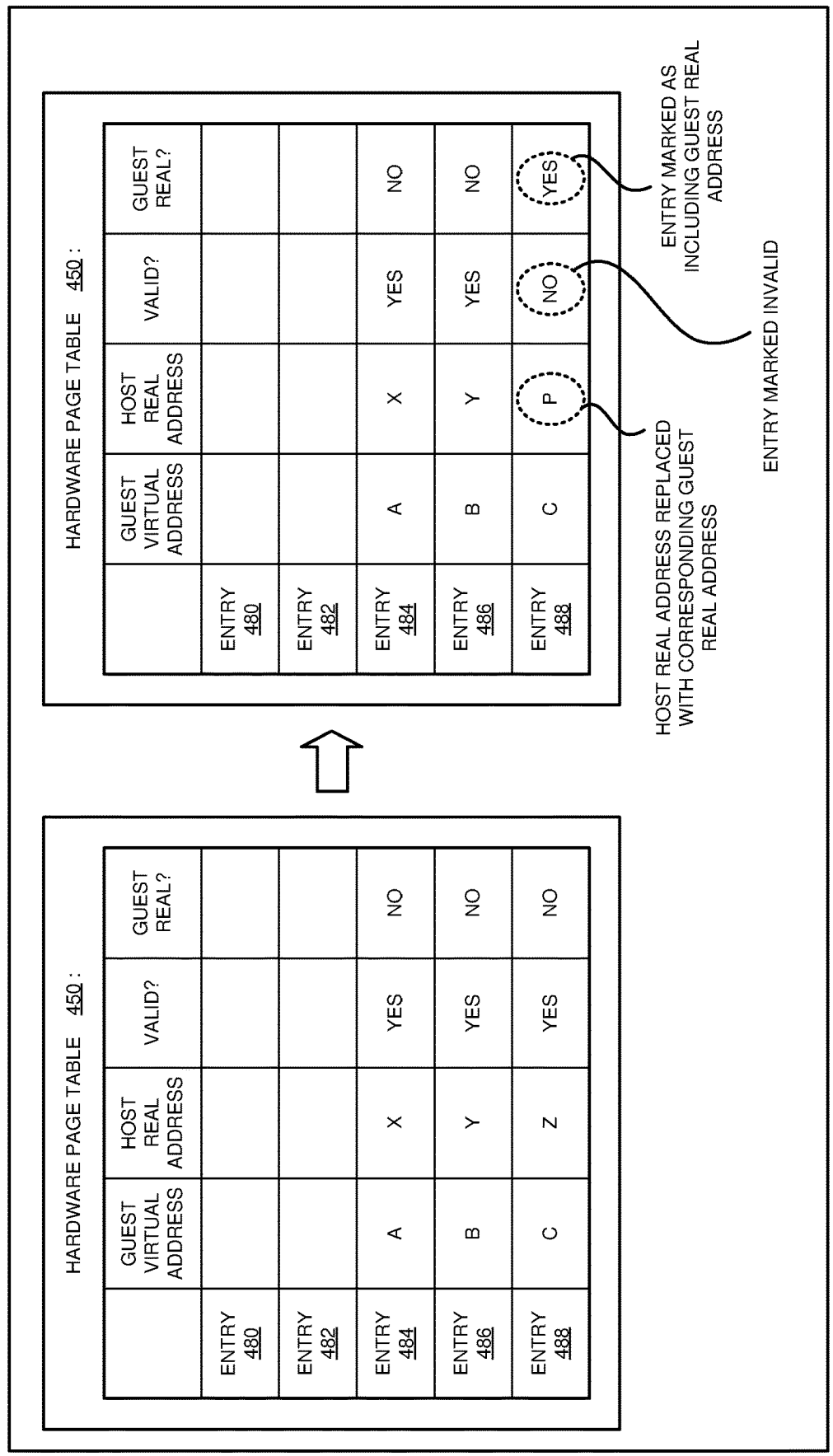
FIG. 5 depicts a continued example of preserving transient address translation information across a firmware assisted dump procedure in accordance with an illustrative embodiment.

With reference to FIG. 5, this figure depicts a continued example of preserving transient address translation information across a firmware assisted dump procedure in accordance with an illustrative embodiment. Hashed page table 450 and entries 480, 482, 484, 486, and 488 are the same as hashed page table 450 and entries 480, 482, 484, 486, and 488 in FIG. 4.

As depicted, because entry 488 refers to a location within memory mapped hardware 415, application 300 has replaced entry 488 with entry 588. In particular, application 300 has replaced the host real address stored in entry 588 with a corresponding guest real address. Application 300 has updated the bit indicating whether or not the entry is valid to mark the entry as invalid. Application 300 has updated the bit indicating whether or not the entry contains a guest real address to indicate that the entry does contain a guest real address. Application 300 provides the information within hashed page table 450 to a requesting guest when requested.

Figure 6:
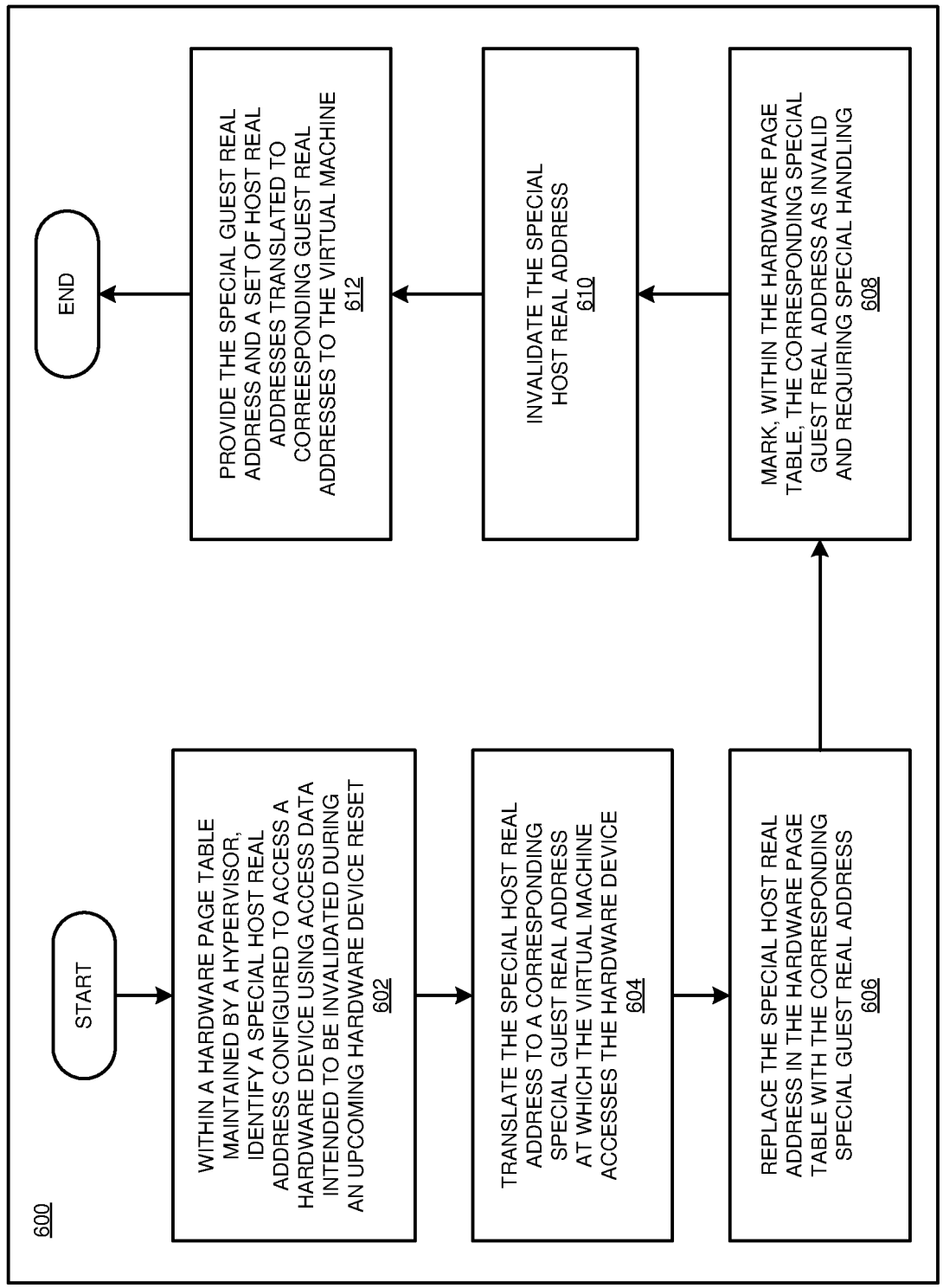
FIG. 6 depicts a flowchart of an example process for preserving transient address translation information across a firmware assisted dump procedure in accordance with an illustrative embodiment.

With reference to FIG. 6, this figure depicts a flowchart of an example process for preserving transient address translation information across a firmware assisted dump procedure in accordance with an illustrative embodiment. Process 600 can be implemented in application 300 in FIG. 3.

In block 602, the application, within a hashed page table maintained by a hypervisor, identifies a special host real address configured to access a hardware device using access data intended to be invalidated during an upcoming hardware device reset. In block 604, the application translates the special host real address to a corresponding special guest real address at which the virtual machine accesses the hardware device. In block 606, the application replaces the special host real address in the hashed page table with the corresponding special guest real address. In block 608, the application marks, within the hashed page table, the corresponding special guest real address as invalid and requiring special handling. In block 610, the application resets the hardware device, invalidating the special host real address. In block 612, the application provides the special guest real address and a set of host real addresses translated to corresponding guest real addresses to the virtual machine. Then the application ends.

Thus, a computer implemented method, system or apparatus, and computer program product are provided in the illustrative embodiments for preserving transient address translation information across a firmware assisted dump procedure and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying, within a hashed page table maintained by a hypervisor, a special host real address, the special host real address configured to access a hardware device using access data intended to be invalidated during an upcoming reset of the hardware device, the identifying occurring as part of a firmware assisted dump process for a virtual machine executing on the hypervisor;
   translating the special host real address to a corresponding special guest real address, the special guest real address comprising an address at which the virtual machine accesses the hardware device;
   replacing, within the hashed page table, the special host real address with the corresponding special guest real address;
   marking, within the hashed page table, the corresponding special guest real address as invalid and requiring special handling;
   causing an invalidating, subsequent to the replacing, of the special host real address; and
   providing, to the virtual machine subsequent to the invalidating, the special guest real address and translated address information, the translated address information comprising a set of host real addresses translated to corresponding guest real addresses.

2. The computer-implemented method of claim 1, further comprising:
   rejecting, for the special guest real address entry within the hashed page table, an operation other than the providing.

3. The computer-implemented method of claim 1, wherein the hardware device comprises a device other than a memory.

4. The computer-implemented method of claim 1, wherein the special host real address is configured to access the hardware device using a memory mapped addressing scheme.

5. The computer-implemented method of claim 4, wherein using the memory mapped addressing scheme comprises:
   mapping to a first host real address, a location of the hardware device;
   writing, by writing data to the first host real address, the location; and
   reading, by reading data at the first host real address, the location.

6. The computer-implemented method of claim 1, wherein the firmware assisted dump process comprises providing to the virtual machine during a reboot process subsequent to a guest operating system crash, state data, the state data comprising data of the virtual machine prior to the crash.

7. A computer usable program product comprising one or more computer-readable storage media, and program instructions stored on at least one of the one or more storage media, the stored program instructions comprising:
   program instructions to identify, within a hashed page table maintained by a hypervisor, a special host real address, the special host real address configured to access a hardware device using access data intended to be invalidated during an upcoming reset of the hardware device, the identifying occurring as part of a firmware assisted dump process for a virtual machine executing on the hypervisor;

program instructions to translate the special host real address to a corresponding special guest real address, the special guest real address comprising an address at which the virtual machine accesses the hardware device;

program instructions to replace, within the hashed page table, the special host real address with the corresponding special guest real address;

program instructions to mark, within the hashed page table, the corresponding special guest real address as invalid and requiring special handling;

program instructions to cause an invalidating, subsequent to the replacing, of the special host real address; and program instructions to provide, to the virtual machine subsequent to the invalidating, the special guest real address and translated address information, the translated address information comprising a set of host real addresses translated to corresponding quest real addresses.

8. The computer usable program product of claim 7, further comprising:

program instructions to reject, for the special guest real address entry within the hashed page table, an operation other than the providing.

9. The computer usable program product of claim 7, wherein the hardware device comprises a device other than a memory.

10. The computer usable program product of claim 7, wherein the special host real address is configured to access the hardware device using a memory mapped addressing scheme.

11. The computer usable program product of claim 10, wherein using the memory mapped addressing scheme comprises:

program instructions to map to a first host real address, a location of the hardware device;

program instructions to write, by writing data to the first host real address, the location; and program instructions to read, by reading data at the first host real address, the location.

12. The computer usable program product of claim 7, wherein the firmware assisted dump process comprises providing to the virtual machine during a reboot process subsequent to a guest operating system crash, state data, the state data comprising data of the virtual machine prior to the crash.

13. The computer usable program product of claim 7, wherein the stored program instructions are stored in at least one of the one or more storage media of a local data processing system, and wherein the stored program instructions are transferred over a network from a remote data processing system.

14. The computer usable program product of claim 7, wherein the stored program instructions are stored in at least one of the one or more storage media of a server data processing system, and wherein the stored program instructions are downloaded over a network to a remote data processing system for use in a computer readable storage medium associated with the remote data processing system.

15. A computer system comprising one or more processors and one or more computer-readable storage media, and program instructions stored on at least one of the one or more storage media for execution by at least one of the one or more processors, the stored program instructions comprising:

program instructions to identify, within a hashed page table maintained by a hypervisor, a special host real address, the special host real address configured to access a hardware device using access data intended to be invalidated during an upcoming reset of the hardware device, the identifying occurring as part of a firmware assisted dump process for a virtual machine executing on the hypervisor;

program instructions to translate the special host real address to a corresponding special guest real address, the special guest real address comprising an address at which the virtual machine accesses the hardware device;

program instructions to replace, within the hashed page table, the special host real address with the corresponding special guest real address;

program instructions to mark, within the hashed page table, the corresponding special guest real address as invalid and requiring special handling;

program instructions to cause an invalidating, subsequent to the replacing, of the special host real address; and program instructions to provide, to the virtual machine subsequent to the invalidating, the special guest real address and translated address information, the translated address information comprising a set of host real addresses translated to corresponding guest real addresses.

16. The computer system of claim 15, further comprising:

program instructions to reject, for the special guest real address entry within the hashed page table, an operation other than the providing.

17. The computer system of claim 15, wherein the hardware device comprises a device other than a memory.

18. The computer system of claim 15, wherein the special host real address is configured to access the hardware device using a memory mapped addressing scheme.

19. The computer system of claim 18, wherein using the memory mapped addressing scheme comprises:

program instructions to map to a first host real address, a location of the hardware device;

program instructions to write, by writing data to the first host real address, the location; and program instructions to read, by reading data at the first host real address, the location.

20. The computer system of claim 15, wherein the firmware assisted dump process comprises providing to the virtual machine during a reboot process subsequent to a guest operating system crash, state data, the state data comprising data of the virtual machine prior to the crash.

* * * * *